Patented Aug. 27, 1946

2,406,674

UNITED STATES PATENT OFFICE 2,406,674

MANUFACTURE OF VINYL n-BUTYL ETHER

William John Roy Evans, Manchester, England, assignor to Imperial Chemical Industries Limited, a corporation of Great Britain No Drawing. Application November 9, 1944, Serial No. 562,736. In Great Britain November 22, 1943

15 Claims. (Cl. 260—614)

This invention relates to improvements in the manufacture of n-butyl vinyl ether, more particularly to improvements in the manufacture of this vinyl ether from acetylene and n-butyl alcohol.

It is known that vinyl ethers may be obtained by reacting acetylene and alcohols in the presence of basic substances which act as catalysts during the reaction, for example, potassium alkoxides. However, such processes usually require the use of high pressures and are accompanied by the hazards necessarily associated with the use of acetylene at high pressures.

It has been proposed to make vinyl ethers from acetylene and alcohols at ordinary pressures by interacting them in the presence of basic substances, for example, potassium alkoxides, and in the presence of liquids, for example liquid paraffin, which boil at temperatures higher than the reaction temperature. Although working in accordance with this proposal obviates the hazards involved in using acetylene at high pressures, experiments show that, under such conditions, the life of the catalyst is short.

It has now been found that, when vinyl n-butyl ether is made by reacting acetylene and n-butyl alcohol at ordinary pressure with a potassium alkoxide as the catalyst, the use of secondary or tertiary aromatic amines, as high boiling media for the reaction, greatly lengthens the life of the catalyst and also appreciably enhances its activity.

Thus, according to the present invention there is provided a process for the manufacture of n-butyl vinyl ether which comprises bringing acetylene and n-butyl alcohol into contact with a potassium alkoxide dissolved or suspended in a medium consisting solely or mainly of a secondary or tertiary aromatic amine at pressure not substantially greater than atmospheric and at a temperature of about 150–200° C.

As secondary or tertiary aromatic amines there may be used, for example, methylaniline, dimethylaniline, ethylaniline, diethylaniline, benzylaniline and dibenzylaniline.

As catalyst it is preferred to use potassium n-butyl alkoxide.

The reaction is preferably effected in an atmosphere free from oxygen.

Preferably an antioxidant, for example, N:N'-diphenyl-p-phenylenediamine, is included with the reagents.

In a convenient way of operating the process of the invention the alkoxide dissolved in some of the alcohol which is to be converted into the ether is added to a large proportion of the secondary or tertiary amine. The mixture is heated in a reaction vessel for example, at 150–180° C., under conditions such that the presence of oxygen is avoided, as by passing a stream of an inert gas such as nitrogen through the liquid. Acetylene gas and the alcohol in vapour form are then passed thrugh the liquid, for example, at a pressure of 2–5 lbs. per square inch, the liquid preferably being maintained at about 170–190° C. The issuing vapours are fractionated and condensed, and the ether, which is in the condensate, is collected and, if desired, purified by conventional means.

The invention is illustrated but not limited by the following example, in which parts are expressed by weight.

Example 13 parts of potassium are dissolved in 60 parts of n-butyl alcohol and 0.5 part of N:N'-diphenyl-p-phenylene-diamine and 75 parts of diethylaniline are added. This solution is then transferred to a reaction tower, which is fitted with a fractionating column with dephlegmator control and a means for condensing vapours which pass through the column, the tower containing 865 parts of diethylaniline at a temperature of 160° C. through which a stream of dry nitrogen is passing. The temperature is raised to 180–190° C., and the nitrogen flow reduced gradually to zero whilst a mixture of n-butyl alcohol at 200 parts per hour and acetylene at 35 parts per hour, preheated to 180° C., is fed at a pressure above atmospheric pressure into the base of the tower through a gas distributor. A mixture of vinyl-n-butyl ether, n-butyl alcohol and acetylene passes from the top of the tower to the base of a fractionating column. The n-butyl alcohol returns to the reaction tower, while the azeotropic mixture of vinyl-n-butyl ether and n-butyl alcohol, 89% ether-11% alcohol, (or a weaker mixture according to the control exercised in the column) passes out of head of the column and is condensed and collected. The production of the ether initially is 157 parts per hour; it is 94 parts per hour after 6 hours and 63 parts per hour after 7½ hours. The ether may be purified by long refluxing over sodium followed by fractional distillation. The conversion of acetylene is 50–60% per single passage.

When production falls to an uneconomic rate, spent catalyst, which comes out of solution, may be settled and withdrawn from the tower, while fresh catalyst solution may be added to the tower, thus making the process continuous.

Using kerosene, which has been distilled over potassium, in place of the diethylaniline the production of ether initially is about 60 parts per hour and the catalyst is expended after 3 hours' working.

I claim:

1. Process for the manufacture of vinyl n-butyl ether, which comprises bringing acetylene and n-butyl alcohol into contact with a potassium alkoxide in a medium composed at least mainly of an amine selected from the group consisting of secondary and tertiary aromatic amines, at a temperature of 150–200° C.

2. Process for the manufacture of vinyl n-butyl ether, which comprises bringing acetylene and n-butyl alcohol into contact with potassium n-butoxide in a medium composed at least mainly of an amine selected from the group consisting of secondary and tertiary aromatic amines, at a temperature of 150–200° C.

3. Process for the manufacture of vinyl n-butyl ether, which comprises bringing acetylene and n-butyl alcohol into contact with a potassium alkoxide and an antioxidant in a medium composed at least mainly of an amine selected from the group consisting of secondary and tertiary aromatic amines, at a temperature of 150–200° C.

4. Process for the manufacture of vinyl n-butyl ether which comprises bringing acetylene and n-butyl alcohol into contact with potassium n-butoxide and an antioxidant in a medium composed at least mainly of an amine selected from the group consisting of secondary and tertiary aromatic amines, at a pressure of 700–900 mm. and at a temperature of 150–200° C.

5. Process for the manufacture of vinyl n-butyl ether, which comprises bringing acetylene and n-butyl alcohol into contact with a potassium alkoxide and N:N'-diphenyl-p-phenylenediamine in a medium composed at least mainly of an amine selected from the group consisting of secondary and tertiary aromatic amines, at a temperature of 150–200° C.

6. Process for the manufacture of vinyl n-butyl ether which comprises bringing acetylene and n-butyl alcohol into contact with potassium n-butoxide and N:N'-diphenyl-p-phenylenediamine in a medium composed at least mainly of an amine selected from the group consisting of secondary and tertiary aromatic amines, at a temperature of 150–200° C.

7. Process for the manufacture of vinyl n-butyl ether, which comprises interacting acetylene and n-butyl alcohol in the presence of a potassium alkoxide in diethylaniline.

8. Process for the manufacture of vinyl n-butyl ether, which comprises interacting acetylene and n-butyl alcohol in the presence of potassium n-butoxide in diethylaniline.

9. Process for the manufacture of vinyl n-butyl ether, which comprises interacting acetylene and n-butyl alcohol in the presence of a potassium alkoxide and N:N'-diphenyl-p-phenylenediamine.

10. Process for the manufacture of vinyl n-butyl ether, which comprises interacting acetylene and n-butyl alcohol in the presence of a potassium alkoxide and N:N'-diphenyl-p-phenylenediamine at a pressure of 700–900 mm. and at a temperature of 150–200° C.

11. Process for the manufacture of vinyl n-butyl ether, which comprises interacting acetylene and n-butyl alcohol in the presence of a potassium alkoxide in diethylaniline under an atmosphere free from oxygen.

12. Process for the manufacture of vinyl n-butyl ether, which comprises interacting acetylene and n-butyl alcohol in the presence of potassium n-butoxide in diethylaniline under an atmosphere free from oxygen.

13. Process for the manufacture of vinyl n-butyl ether, which comprises interacting acetylene and n-butyl alcohol in the presence of a potassium alkoxide and N:N'-diphenyl-p-phenylenediamine in an atmosphere from from oxygen.

14. Process for the manufacture of vinyl n-butyl ether, which comprises interacting acetylene and n-butyl alcohol in the presence of potassium n-butoxide and N:N'-diphenyl-p-phenylenediamine at a pressure of 700–900 mm. at the temperature of 150–200° C. under an atmosphere free from oxygen.

15. Process for the manufacture of vinyl n-butyl ether, which comprises interacting acetylene and n-butyl alcohol in the presence of potassium n-butoxide and N:N'-diphenyl-p-phenylenediamine in diethylaniline at a pressure of 150–200° C. under an atmosphere free from oxygen.

WILLIAM JOHN ROY EVANS.